United States Patent
Takayasu et al.

(10) Patent No.: US 9,822,025 B2
(45) Date of Patent: Nov. 21, 2017

(54) METHOD FOR TREATING SOIL-CONTAMINATING WATER USING PHOTOCATALYTIC MATERIAL

(71) Applicant: SHOWA CO., LTD., Nara (JP)

(72) Inventors: Teruki Takayasu, Nara (JP); Teruo Arai, Nara (JP); Kinji Onoda, Nara (JP)

(73) Assignee: SHOWA CO., LTD., Ikoma, Nara (JP)

( * ) Notice: Subject to any disclaimer, the term of this patent is extended or adjusted under 35 U.S.C. 154(b) by 0 days.

(21) Appl. No.: 14/892,434

(22) PCT Filed: Jun. 28, 2013

(86) PCT No.: PCT/JP2013/067845
§ 371 (c)(1),
(2) Date: Feb. 12, 2016

(87) PCT Pub. No.: WO2014/207906
PCT Pub. Date: Dec. 31, 2014

(65) Prior Publication Data
US 2016/0257585 A1    Sep. 8, 2016

(51) Int. Cl.
*C02F 1/32*    (2006.01)
*C02F 1/72*    (2006.01)
(Continued)

(52) U.S. Cl.
CPC .............. *C02F 1/725* (2013.01); *B01D 1/14* (2013.01); *B01D 53/02* (2013.01);
(Continued)

(58) Field of Classification Search
CPC .... B01J 20/06; B01J 20/2803; B01J 2220/56; B01J 2220/58; B82Y 30/00;
(Continued)

(56) References Cited

U.S. PATENT DOCUMENTS

| 5,554,300 A | 10/1996 | Butters et al. |
| 2002/0096479 A1 | 7/2002 | Butters et al. |

(Continued)

FOREIGN PATENT DOCUMENTS

| CN | 201454339 U | 5/2010 |
| CN | 101921023 A | 12/2010 |

(Continued)

OTHER PUBLICATIONS

CN 203803373 U (Abstract Translation) Wang Xudong Sep. 2014 China.*

(Continued)

*Primary Examiner* — Walter D. Griffin
*Assistant Examiner* — Cameron J Allen
(74) *Attorney, Agent, or Firm* — MH2 Technology Law Group, LLP

(57) ABSTRACT

The present invention provides a novel method for treating soil-contaminated water, the method using a photocatalytic material capable of efficiently removing, by light irradiation alone, volatile organic compounds and heavy metals that give rise to soil contamination. The present invention provides a method for treating soil-contaminated water that detoxifies volatile organic compounds contained in soil-contaminated water using a photocatalytic material, the method being characterized by including the steps of (1) subjecting the soil-contaminated water to a gas-liquid separation to obtain a gas phase, and (2) decomposing the volatile organic compounds contained in the gas phase obtained in step (1) using the photocatalytic material. The present invention further provides a method for treating soil-contaminated water using a photocatalytic material to remove heavy metals contained in the soil-contaminated water, the method being characterized, by including the steps of (1) subjecting the soil-contaminated water to a
(Continued)

gas-liquid separation to obtain a liquid phase, and (2) removing the heavy metals contained in the liquid phase obtained in step (1) using the photocatalytic material.

5 Claims, 1 Drawing Sheet

(51) Int. Cl.
| | |
|---|---|
| C02F 1/20 | (2006.01) |
| B01D 53/86 | (2006.01) |
| B01D 1/14 | (2006.01) |
| B01D 53/02 | (2006.01) |
| B01D 53/88 | (2006.01) |
| C02F 1/28 | (2006.01) |
| B01J 21/06 | (2006.01) |
| B01J 35/00 | (2006.01) |
| B01J 37/34 | (2006.01) |
| B01D 53/72 | (2006.01) |
| C02F 1/467 | (2006.01) |
| C02F 101/20 | (2006.01) |
| C02F 101/32 | (2006.01) |
| C02F 101/36 | (2006.01) |
| C02F 103/06 | (2006.01) |

(52) U.S. Cl.
CPC ..... *B01D 53/8662* (2013.01); *B01D 53/8687* (2013.01); *B01D 53/885* (2013.01); *B01J 21/063* (2013.01); *B01J 35/004* (2013.01); *B01J 37/348* (2013.01); *C02F 1/20* (2013.01); *C02F 1/283* (2013.01); *C02F 1/32* (2013.01); *B01D 53/72* (2013.01); *B01D 53/88* (2013.01); *B01D 2253/102* (2013.01); *B01D 2255/20707* (2013.01); *B01D 2255/702* (2013.01); *B01D 2255/802* (2013.01); *B01D 2257/2064* (2013.01); *B01D 2257/7027* (2013.01); *B01D 2259/804* (2013.01); *C02F 1/4678* (2013.01); *C02F 2101/20* (2013.01); *C02F 2101/322* (2013.01); *C02F 2101/36* (2013.01); *C02F 2103/06* (2013.01); *C02F 2305/10* (2013.01)

(58) Field of Classification Search
CPC .............. C01G 23/053; C01G 23/0532; C02F 2101/22; C02F 2101/006; C02F 2101/103; C02F 2101/20; C02F 2101/203; C02F 2101/206; C02F 1/72; C02F 1/20; C02F 1/281; C01P 2002/72; C01P 2004/64; C01P 2006/12; C01P 2006/14; C01P 2006/16; H01M 8/06; H01M 8/10; B01D 53/86; B01D 53/02; B01D 53/88

See application file for complete search history.

(56) References Cited

U.S. PATENT DOCUMENTS

| | | | |
|---|---|---|---|
| 2006/0144793 A1* | 7/2006 | Dadachov | B01J 20/06 210/660 |
| 2013/0028796 A1* | 1/2013 | Nakatani | B01D 53/8603 422/121 |
| 2013/0078174 A1 | 3/2013 | Takayasu et al. | |

FOREIGN PATENT DOCUMENTS

| | | | |
|---|---|---|---|
| CN | 203803373 U * | 9/2014 | ............ B01D 53/86 |
| DE | 102009013255 A1 | 9/2010 | |
| JP | H07-144136 A | 6/1995 | |
| JP | 2003-047952 A | 2/2003 | |
| JP | 2003-117540 A | 4/2003 | |
| JP | 2004-105817 A | 4/2004 | |
| JP | 2005-240139 A | 9/2005 | |
| JP | 2007-29915 A | 2/2007 | |
| JP | 2010-69449 A | 4/2010 | |
| JP | 2012-115753 A | 6/2012 | |

OTHER PUBLICATIONS

Exhaust purification system for volatile organic; pollutants of soil vapor extraction (SVE) Zhang, Jinghui; (Inventors). Tianjin Ecology City Environmental Prot Co Ltd (Assignee). CN 203803373 U. (Published Sep. 3, 2014). Translation.*
Supplementary European Search Report dated Mar. 28, 2017 for European Patent Application No. 13887884.8, 13 pages.
Supplementary Partial European Search Report dated Dec. 12, 2016 for European Patent Application No. 13887884.8, 7 pages.
Office Action dated Dec. 21, 2016 for Chinese Patent Application No. 201380077483.9, 10 pages (including partial translation).
Chinese Office Action dated Jun. 15, 2017 for Chinese Patent Application No. 201380077483.9, 14 pages, including English translation.
Hui Fen Yang et al., Environmental Materials Science, Chemical Industry Publishing House, May 2008, First Edition, pp. 366-367. Concise explanation of relevance as described in the Chinese Office Action dated Jun. 15, 2017 for Chinese Patent Application No. 201380077483.9, including at p. 5 (last paragraph) and p. 7 (3rd paragraph).

* cited by examiner

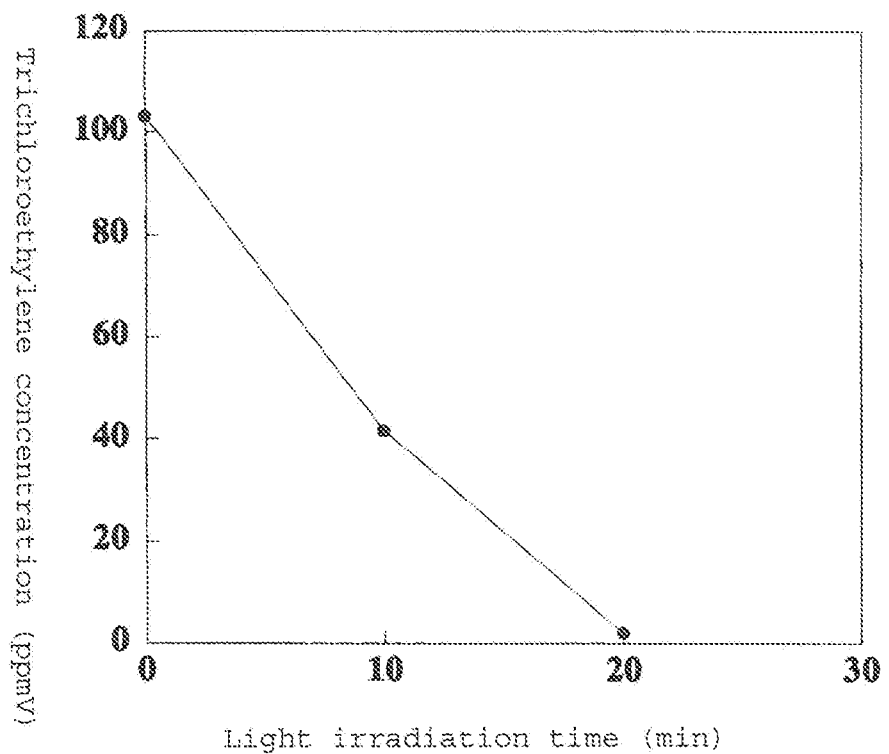

METHOD FOR TREATING SOIL-CONTAMINATING WATER USING PHOTOCATALYTIC MATERIAL

CROSS-REFERENCE TO RELATED APPLICATIONS

This application is a U.S. National Stage application of PCT/JP2013/067845 filed 28 Jun. 2013, the entire disclosures of which are hereby incorporated by reference in their entireties.

TECHNICAL FIELD

The present invention relates to a method for treating soil-contaminated water using a photocatalytic material.

More specifically, the present invention relates to a method for detoxifying soil-contaminated water by treatment using a photocatalytic material, the soil-contaminated water being water contaminated by hazardous volatile organic compounds and heavy metals contained in soil and groundwater.

BACKGROUND ART

In recent years, volatile organic compounds used in industrial cleaning and hazardous metals contained in industrial effluent have entered soil and caused serious soil contamination.

Various methods are used to treat volatile organic compounds, such as dichloromethane, carbon tetrachloride, dichloroethane, dichloroethylene, trichloroethane, trichloroethylene, tetrachloroethylene, dichloropropane, benzene, chloroform, toluene, and xylene, that enter soil. For example, a method is known wherein contaminated groundwater drawn from contaminated soil is pumped and aerated, and exhaust gas (gas phase) obtained by gas-liquid separation is treated by a technique such as adsorption treatment with activated carbon or pyrolysis treatment.

However, adsorption treatment with activated carbon is problematic in that adsorption capacity soon reaches saturation, and the adsorption effects last for only a short period of time. Pyrolysis treatment is problematic in that a significant amount of energy is required.

Patent Literature (PTL) 1 discloses a method for decomposing volatile organic confounds comprising pumping and aerating contaminated groundwater to obtain gaseous volatile organic compounds, and subjecting the gaseous volatile organic compound to ultraviolet radiation using a photocatalytic material. The technique disclosed in PTL 1 uses a titanium oxide-coated honeycomb-shaped material as a photocatalytic material to increase the reaction area of the photocatalytic material.

However, the technique disclosed in PTL 1 has a drawback in that since fine titanium oxide powder is used as a photocatalytic material while contained in a binder, nearly all of the titanium, oxide particles are embedded in the binder. Low adhesion between the photocatalytic material and the substrate is also a problem of the technique disclosed in PTL 1.

Methods used for treating hazardous heavy metals, such as lead, cadmium, hexavalent chromium, arsenic, mercury, and copper, that enter soil from industrial effluent include a method for chemically chelating heavy metals, a method, for fixing heavy metals by ion exchanging, a method for separating heavy metals by a high-temperature treatment using an incinerator, and the like.

However, these treatment methods not only have problematically high treatment cost, but also have difficulty in recovering low-concentration heavy metals.

Patent Literature (PTL) 2 discloses a method for removing the heavy metal lead using photocatalytic fine particles having iron oxyhydroxide particles dispersed in and supported on a titanium oxide photocatalyst, or using a photocatalytic material having a plate-shaped, porous, or fibrous material coated with the photocatalytic particles.

However, when the photocatalytic fine particles are directly treated, a problematic amount, of time and effort, is required to separate the photocatalytic fine particles from the solution. Furthermore, the method of coating with photocatalytic fine particles has a drawback in that since fine titanium oxide powder is used while contained in a binder, nearly all of the titanium oxide particles are embedded in the binder. Low adhesion between the photocatalytic material and the substrate is also problematic in the technique disclosed in PTL 2.

CITATION LIST

PTL

PTL 1: JP2004-105817A
PTL 2: JP2010-69449A

SUMMARY OF INVENTION

Technical Problem

An object of the present invention is to provide a new method for treating soil-contaminated water by using a photocatalytic material capable of efficiently removing, by light irradiation alone, volatile organic compounds and heavy metals that give rise to soil contamination.

Solution to Problem

The present inventors conducted extensive research to achieve the above object. As a result, the inventors found that when contaminated water drawn (pumped) from contaminated soil or an aqueous solution (or a mixture) (soil-contaminated water) prepared by injecting water into soil to incorporate volatile organic compounds into water is subjected to a gas-liquid separation (preferably pumped and aerated), and the volatile organic compounds contained in the gas phase are irradiated with light (preferably irradiated with UV light) using a photocatalytic material, the volatile organic compounds are decomposed, and detoxified.

The reaction of decomposing volatile organic compounds using a photocatalytic material is a reaction in which volatile organic compounds are brought into contact with the surface of a photocatalytic material. Therefore, when the decomposition progresses and the concentrations of the volatile organic compounds become low, the volatile organic compound-decomposition efficiency of the photocatalytic material is reduced.

Accordingly, the inventors further found that when volatile organic compounds remain in a gas phase, a secondary treatment (process, processing), such as removal by adsorption with activated carbon or removal by thermal oxidation, may be used to completely remove the volatile organic compounds.

The present inventors found that when contaminated water drawn (pumped) from contaminated soil or an aqueous solution (or a mixture) (soil-contaminated water) prepared by injecting water into soil to incorporate heavy metals into water is subjected to a gas-liquid separation (preferably pumped and aerated) to obtain a liquid phase, and heavy metals contained in the liquid phase are irradiated with light (preferably irradiated with UV light) using a photocatalytic material, the heavy metals are removed and detoxified.

The inventors further found that as in the decomposition of volatile compounds using a photocatalytic material, when heavy metals remain in the liquid phase after removal using a photocatalytic material, a secondary treatment (process, processing) may be used to completely remove the heavy metals, the secondary treatment being, for example, a method for removing heavy metals by electrolytic treatment, a method for insolubilizing heavy metals by chemical chelation, a method for separating heavy metals by hydroxylation treatment, or the like.

The inventors further found that it is preferable to use in the present invention a photocatalytic material containing a large amount of crystalline titanium oxide, in particular, an anatase titanium oxide having a high photocatalytic activity, on the surface of titanium metal or a titanium alloy, the crystalline titanium oxide or the anatase titanium oxide being obtained by forming titanium nitride on the surface of titanium metal or a titanium alloy, and then anodizing the titanium nitride.

The present invention has been accomplished based on these findings.

Specifically, the present invention provides a technique of detoxifying soil-contaminated water (soil contaminated water, contaminated soil water) by efficiently removing hazardous substances contained in the soil-contaminated water (removal of contamination from soil or water), such as volatile organic compounds and heavy metals.

Item 1. A method for treating soil-contaminated water using a photocatalytic material to detoxify volatile organic compounds contained in the soil-contaminated water, the method comprising the steps of:
(1) subjecting the soil-contaminated water to a gas-liquid separation to obtain a gas phase, and
(2) decomposing the volatile organic compounds contained in the gas phase obtained in step (1) using the photocatalytic material.

Item 2. A method for treating soil-contaminated water using a photocatalytic material to remove heavy metals contained in the soil-contaminated water, the method comprising the steps of:
(1) subjecting the soil-contaminated water to a gas-liquid separation to obtain a liquid phase, and
(2) removing the heavy metals contained in the liquid phase obtained in step (1) using the photocatalytic material.

Item 3. The method according to Item 1 or 2, wherein the photocatalytic material has a crystalline titanium oxide film obtained by forming titanium nitride on the surface of titanium metal or a titanium alloy and then performing anodization.

Item 4. The method according to Item 3, wherein the crystalline titanium oxide is anatase titanium oxide.

Item 5. The method according to Item 1, 3, or 4, wherein when undecomposed volatile organic compounds remain in the gas phase after step (2), the method further comprises a step of (3) subjecting the volatile organic compounds in the gas phase to a secondary treatment by using at least one method selected from the group consisting of a method of removal by adsorption with activated carbon and a method of removal by thermal oxidation.

Item 6. The method for treating soil-contaminated water using a photocatalytic material according to Item 2, 3, or 4, wherein when unremoved heavy metals remain in the liquid phase after step (2), the method further comprises a step of (3) subjecting the heavy metals in the liquid phase to a secondary treatment by using at least one method selected from the group consisting of a method, of removing heavy metals by electrolytic treatment, a method of insolubilizing heavy metals by chemical chelation, and a method of separating heavy metals by hydroxylation treatment.

Item 7. A soil-contaminated water treatment device for detoxifying volatile organic compounds contained, in soil-contaminated water using a photocatalytic material, the device comprising a gas phase-production chamber for subjecting the soil-contaminated water to a gas-liquid separation to obtain a gas phase, and a photocatalytic device for decomposing the volatile organic compounds contained in the gas phase using the photocatalytic material.

Item 8. The soil-contaminated water treatment device according to Item 7, comprising a secondary treatment chamber for treating the volatile organic compounds in the gas phase by using at least one method selected from the group consisting of a method of removal by adsorption with activated carbon and a method of removal by thermal oxidation.

Item 9. A soil-contaminated water treatment device for detoxifying heavy metals contained in soil-contaminated water using a photocatalytic material, the device comprising a liquid phase-production chamber for subjecting the soil-contaminated water to a gas-liquid separation to obtain a liquid phase and a photocatalytic device for removing the heavy metals in the liquid phase using the photocatalytic material.

Item 10. The soil-contaminated water treatment device according to Item 9, comprising a secondary treatment chamber for treating the heavy metals in the liquid phase by using at least one method selected from the group consisting of a method of removing heavy metals by electrolytic treatment, a method for insolubilizing heavy metals by chemical chelation, and a method of separating heavy metals by hydroxylation treatment.

The present invention is explained in detail below.

(1) Soil-Contaminated Water

Volatile organic compounds and heavy metals (or heavy metal ions) present in soil (or groundwater) are those that enter soil from the ground surface or in the vicinity of the surface as volatile organic compounds and heavy metals (or heavy metal ions), and permeate underground, which results in contamination of the soil and groundwater (soil contaminated water, contaminated soil water).

The volatile organic compounds and heavy metals (or heavy metal ions) flowing from the source of contamination permeate underground in the form of a liquid, and partially reside in gaps in the soil.

If the gaps in the strata are large, the liquid from the source of contamination passes through the aquifer layer and reaches an impermeable layer, such as a clay layer. If the gaps in the strata, are small, the liquid from the source of contamination resides in the vicinity of the groundwater surface.

In the method and device for treating soil-contaminated water of the present invention, the soil-contaminated water to be treated is an aqueous solution (or a mixture) containing such volatile organic compounds and heavy metals (or heavy metal ions) that contaminate soil and groundwater as described above.

Specific examples of soil-contaminated water include contaminated groundwater drawn (pumped) from contaminated soil containing volatile organic compounds and heavy metals (or heavy metal ions); aqueous solutions (or mixtures) obtained by injecting water into soil to incorporate volatile organic compounds into the water; aqueous solutions (or mixtures) obtained by injecting water into soil to dissolve heavy metals (or heavy metal ions) in the water; and the like.

If groundwater is not present in the underground soil, water is injected into the soil, and the resulting water is drawn (or pumped) from the soil to incorporate or dissolve volatile organic compounds and heavy metals (or heavy metal ions) in the water; afterward, the volatile organic compounds and heavy metals (or heavy metal ions) can be recovered from the soil (remove contamination from soil or water).

(2) Photocatalytic Material

As the photocatalytic material of the present invention, it is preferable to use a titanium oxide having high activity and stability. When irradiated with near-ultraviolet of 400 nm or less, a titanium oxide photocatalyst generates positive holes in the valence band while generating electrons in the conduction band, thereby causing an oxidation-reduction reaction.

As a result of the oxidation-reduction reaction reactive oxygen species such as OH radicals are generated. This reactive oxygen oxidatively decomposes organic substances and the like in gas and liquid phases, and also reduces metal ions and the like.

As the photocatalytic material, it is preferable to use a photocatalytic material having a crystalline titanium oxide film that is obtained by performing anodization after forming titanium nitride on the surface of titanium metal or a titanium alloy.

The crystalline titanium oxide is preferably anatase titanium oxide. Because the energy level of the conduction band in anatase titanium oxide is higher than that of rutile titanium oxide, the electrons excited to the conduction band efficiently contribute to the reaction. Accordingly, the photocatalytic activity of anatase titanium oxide is considered to be higher than that of rutile titanium oxide.

The anatase titanium oxide film can be produced by using a production method including the following steps:
(i) forming titanium nitride on the surface of titanium or a titanium alloy; and
(ii) immersing the titanium or titanium alloy obtained, in step (i) in an electrolyte solution containing at least one acid selected from the group consisting of inorganic acids and organic acids having an etching effect on titanium, and performing anodization by controlling the current so that a voltage equal to or higher than the spark-discharge-generating voltage can be applied.

In this specification, titanium and titanium alloys may simply be referred to as titanium materials.

In the method for producing an anatase titanium oxide film, the formation of titanium nitride in step (1) is preferably performed by using at least one treatment selected from the group consisting of PVD, CVD, thermal-spraying, heat treatment in a nitrogen gas atmosphere, and heat treatment in a nitrogen gas atmosphere in the presence of an oxygen-trapping agent.

In the method for producing an anatase titanium oxide film, the heat, treatment in a nitrogen gas atmosphere is preferably performed by heating titanium or a titanium alloy in a nitrogen gas atmosphere.

In step (i), titanium nitride is formed on the surface of titanium or a titanium alloy.

When a titanium alloy is used in the present invention, the type of titanium alloy is not particularly limited. Examples of titanium alloys include Ti-6Al-4V, Ti-0.5 Pd, and the like.

In step (i), a titanium nitride layer is formed on the surface of a titanium material to a thickness of typically about 0.1 to 100 μm, preferably about 0.5 to 50 μm, and more preferably about 1 to 30 μm.

The method for forming titanium nitride on the surface of a titanium material is not particularly limited. Examples of such methods include a method for physically or chemically attaching titanium nitride to the surface of a titanium material, and a method for reacting titanium and nitrogen on the surface of a titanium material to thereby form titanium nitride on the surface.

Specific examples of such methods include PVD (physical vapor deposition) treatment, CVD (chemical vapor deposition) treatment, thermal-spraying treatment (film formation by spraying), heat treatment of a titanium material, in a nitrogen gas atmosphere, and the like.

Examples of the PVD treatment include ion plating, sputtering, and the like. Examples of the CVD treatment include thermal CVD, plasma CVD, laser CVD, and like treatments. Examples of the thermal spraying treatment include flame-spraying, arc-spraying, plasma-spraying, laser-spraying, and like treatments.

The heat treatment of a titanium material in a nitrogen gas atmosphere can be performed, for example, by using a method comprising heating a titanium material typically at 500° C. or more (preferably at 750° C. or more) in a nitrogen gas atmosphere.

The nitrogen gas atmosphere in the heat treatment is not particularly limited, insofar as the nitrogen gas pressure is typically about 0.01 to 100 MPa, preferably about 0.1 to 10 MPa, and more preferably about 0.1 to 1 MPa.

The heating time of a titanium material in the heat treatment may be typically 1 to 12 hours, preferably 2 to 8 hours, more preferably 3 to 6 hours.

In the process of step (i), the type of titanium nitride formed on the surface of a titanium material is not particularly limited. Examples of the titanium nitride include TiN, $Ti_2N$, $\alpha\text{-}TiN_{0.3}$, $\eta\text{-}T_3N_{2-X}$, $\xi\text{-}Ti_4N_{3-X}$ (provided that X is 0 or more and less than 3), mixtures thereof, amorphous titanium nitride, and the like.

Preferred among these are TiN, $Ti_2N$, and mixtures thereof; more preferred are TiN, and a mixture of TiN and $Ti_2N$; and particularly preferred is TiN.

As the means for forming titanium nitride in the present invention, one of the above methods may be used singly, or two or more of them, may foe used in combination. Of the above methods for forming titanium nitride, heat treatment of a titanium material in a nitrogen gas atmosphere is preferred in terms of convenience, mass production, production cost, etc.

In the method for producing an anatase titanium oxide film, it is preferable to use an electrolyte solution containing sulfuric acid and/or phosphoric acid, and more preferably an electrolyte solution further containing hydrogen peroxide, in the anodization in step (ii).

In the method for producing an anatase titanium oxide film, the anodization in step (ii) is preferably performed by controlling the current, for generating a spark-discharge-generating voltage.

In step (ii), the anodization is performed by immersing titanium or a titanium alloy obtained in Step (i) in an electrolyte solution containing at least one acid selected from the group consisting of inorganic acids and organic acids having an etching effect on titanium, and applying a voltage equal to or higher than the spark-discharge-generating voltage.

In the anodization in step (ii), it is preferable to use as the electrolyte solution an aqueous solution containing an inorganic acid and/or an organic acid that has an etching effect on titanium. Examples of inorganic acids that have an etching effect on titanium include sulfuric acid, phosphoric acid, hydrofluoric acid, hydrochloric acid, nitric acid, aqua regia, and the like.

Examples of the organic acid that, has an etching effect on titanium include oxalic acid, formic acid, citric acid, trichloroacetic acid, and the like. These acids may be used singly, or in a combination of any two or more regardless of whether they are organic acids or inorganic acids.

A preferable embodiment of an electrolyte solution containing two or more acids is, for example, an aqueous solution containing sulfuric acid and phosphoric acid. Although the proportion of the acids in this electrolyte solution varies depending on the types of acids used, anodization conditions, and other conditions, the total amount of the acids is typically 0.01 to 10 M, preferably 0.1 to 10 M, and more preferably 1 to 10 M.

An example of am electrolyte solution containing sulfuric acid and phosphoric acid is an electrolyte solution containing 1 to 8 M sulfuric acid and 0.1 to 2 M phosphoric acid.

The electrolyte solution preferably contains hydrogen peroxide, in addition to the above organic acid and/or inorganic acid. The electrolyte solution containing hydrogen peroxide allows more efficient production of an anatase titanium oxide film.

When the electrolyte solution contains hydrogen peroxide, the proportion of hydrogen peroxide is not particularly limited, but is, for example, 0.01 to 5 M, preferably 0.01 to 1 M, and more preferably 0.1 to 1 M.

A preferable embodiment of the electrolyte solution used in the anodization in step (ii) is, for example, an aqueous solution containing 1 to 8 M sulfuric acid, 0.1 to 2 M phosphoric acid, and 0.1 to 1 M hydrogen peroxide.

An anatase titanium oxide film is obtained by immersing titanium or a titanium alloy obtained in step (i) in the above electrolyte solution, and performing anodization by applying a constant current so that a voltage equal to or higher than the spark-discharge-generating voltage can be applied.

The current density in the anodization may be 0.1 A/dm$^2$ or more, but is preferably 1 A/dm$^2$ to 10 A/dm$^5$, in terms of profitability, convenience, and performance.

According to the above method, a film containing a large amount of an anatase titanium oxide that has high photocatalytic activity can be obtained.

The above production method allows the production of a photocatalytic material in which a large amount of anatase titanium oxide with high activity is formed on the surface of titanium metal or a titanium alloy.

Therefore, the photocatalytic material can exhibit a photocatalytic function that is much higher than that of conventional photocatalytic materials in which the substrates are coated, with titanium oxide fine particles. Further, using a photocatalytic material obtained by the above production method allows efficient decomposition of volatile organic compounds and removal of heavy metals.

(3) Method for Decomposing Volatile Organic Compounds

The method for treating soil-contaminated water (soil contaminated water, contaminated soil water) (by) using a photocatalytic material according to the present invention detoxifies volatile organic compounds contained in the soil-contaminated water, and is characterized by including the steps of:

(1) subjecting the soil-contaminated water to a gas-liquid separation to obtain a gas phase; and (2) decomposing the volatile organic compounds contained in the gas phase obtained in step (1) (by) using the photocatalytic material.

When undecomposed volatile organic compounds remain in the gas phase after step (2), the method preferably further comprises a step of:

(3) subjecting the volatile organic compounds contained in the gas phase to a secondary treatment by using at least one method selected from the group consisting of a method of removal by adsorption with activated, carbon, and a method of removal, by thermal oxidation.

In step (1), water drawn from contaminated soil (soil-contaminated water) is subjected to a gas-liquid separation to obtain a gas phase. As a gas-liquid separation method, an aeration treatment of supplying pressurized air or the like while ejecting contaminated water (soil-contaminated water) from a nozzle into an aeration tower is preferably performed to separate the contaminated water into gaseous volatile organic compounds (a gas phase) and soil-contaminated water (a liquid phase).

Since the volatile organic compounds in the gas phase contain water, it is preferable to reduce the water content by using a mist separator.

Subsequently, the volatile organic compounds contained in the gas phase obtained in step (1) are decomposed (by) using a photocatalytic material. The gaseous volatile organic compounds from which water has been removed are supplied with a blower to a photocatalytic device including a photocatalytic material and a UV lamp. The volatile organic compounds are decomposed and removed, by an oxidation reaction (by) using a photocatalytic material, thus achieving detoxification.

The photocatalytic material is preferably one or more photocatalytic materials mentioned above.

As a technique for decomposing and removing the volatile organic compounds in the gas phase, a volatile organic compound gas flow system or the like is constructed, and a photocatalytic material with high activity, which is produced by forming titanium nitride on the surface of titanium metal and then performing anodization, is placed in the system, followed by irradiation with light of 400 nm or less (UV lamp), thus performing a decomposition treatment.

A photocatalytic reaction is a surface reaction. The snore often photocatalytic materials and volatile organic compounds are brought into contact with each other, the more efficiently the decomposition progresses.

It is thus preferable to arrange the photocatalytic material in a bellows shape, or to use a porous titanium metal or titanium alloy to be photocatalyzed, thereby performing a nitriding treatment and an anodizing treatment.

Examples of volatile organic compounds (VOC) to be decomposed include dichloromethane, carbon tetrachloride, dichloroethane, dichloroethylene, trichloroethane, trichloroethylene, tetrachloroethylene, dichloropropane, benzene, chloroform, toluene, xylene, and the like.

The soil-contaminated water contains about 0.1 to 1000 ppmV of volatile organic compounds, although this may vary depending on the level of soil contamination and types of volatile organic compounds. The gas phase obtained by subjecting soil-contaminated water to a gas-liquid separation contains about 0.1 to 1000 ppmV of volatile organic compounds.

When undecomposed volatile organic compounds remain in the gas phase after the reaction in step (2), a secondary treatment (process, processing), such as removal by adsorption with activated carbon or removal by thermal oxidation, is preferably further performed to completely remove the volatile organic compounds.

Specifically, the volatile organic compounds remaining after the decomposition treatment (by) using a photocatalytic material can be completely removed by passing the volatile organic compound gas through a column containing activated carbon so as to remove the organic compounds by adsorption or by performing a thermal decomposition treatment.

As the secondary treatment, one of the above treatment methods may be used singly, or two or more of them may be used in combination.

The soil-contaminated water treatment device for detoxifying volatile organic compounds contained in soil-contaminated water (by) using a photocatalytic material according to the present invention is characterized by having a chamber for subjecting the soil-contaminated water to a gas-liquid separation to obtain a gas phase, and a photocatalytic device for decomposing the volatile organic compounds contained in the gas phase (by) using the photocatalytic material.

The device for treating soil-contaminated water of the present invention preferably further comprises a secondary treatment chamber for treating the volatile organic compounds in the gas phase by using at least one method selected from the group consisting of a method of removal by adsorption with activated carbon and a method of removal by thermal oxidation.

The gas-phase production chamber preferably comprises an aeration tower for forming a jet stream, for stirring and mixing the soil-contaminated water and air. The aeration tower preferably comprises a nozzle for ejecting the soil-contaminated water and an air supply pipe for supplying pressurized air. The aeration tower preferably has one or more outlets for discharging the stirred and mixed soil-contaminated water and air containing the volatile organic compounds separated from the soil-contaminated water.

The gas-phase production chamber preferably comprises a mist separator to further reduce the water content.

The gas-phase production chamber preferably comprises a blower for supplying pressurized air to an air supply pipe.

The gas-phase production chamber preferably comprises a pump for ejecting soil-contaminated water under pressure.

Soil-contaminated water ejected from a nozzle and air pressurized through an air supply pipe are supplied to (or in) the aeration tower. In the aeration tower, volatile organic compounds contained in soil-contaminated water are transferred to (or transformed into) a gas phase.

Accordingly, the volatile organic compounds and the like contained in soil-contaminated water are removed with air from contaminated water, and the resulting water contains a smaller amount of volatile organic compounds.

The photocatalytic device preferably comprises a photocatalytic material and a UV lamp. The photocatalytic device preferably has a duct structure.

The device for treating the soil-contaminated water of the present invention preferably comprises a conduit for discharging the gas phase of detoxified soil-contaminated water ejected from the photocatalytic device.

The device preferably comprises a conduit for introducing the gas phase of the detoxified soil-contaminated water (detoxified gas after the photocatalytic reaction) into the aeration tower. The gas phase from detoxified soil-contaminated water can be effectively utilized without dissipating to the outside of the device.

(4) Method for Removing Heavy Metal

The method for treating soil-contaminated water (soil contaminated water, contaminated soil water) (by) using a photocatalytic material according to the present invention removes heavy metals contained in the soil-contaminated water, and comprises the steps of:

(1) subjecting the soil-contaminated water to a gas-liquid separation to obtain a liquid phase, and
(2) removing the heavy metals contained in the liquid phase obtained in step (1) (by) using the photocatalytic material.

When unremoved heavy metals remain in the liquid phase after step (2), the method preferably further comprises a step of:

(3) subjecting the heavy metals contained in the liquid phase to a secondary treatment by using at least one method selected from the group consisting of a method of removing heavy metals by electrolytic treatment, a method of insolubilizing heavy metals by chemical chelation, and a method of separating heavy metals by hydroxylation treatment.

When using the photocatalytic material of the present invention, heavy metal ions, such as mercury, lead, cadmium, arsenic, copper, and hexavalent chromium, present in soil-contaminated water are oxidized or reduced by light, irradiation and precipitated as metals or oxides to efficiently remove the heavy metal ions from the soil-contaminated water.

In step (1), contaminated water drawn from contaminated soil (soil-contaminated water) is subjected to a gas-liquid separation to obtain a liquid phase. As a gas-liquid separation method, an aeration treatment of supplying pressurised, air while ejecting contaminated water (soil-contaminated water) from a nozzle in an aeration tower is performed to separate a solution containing heavy metal ions from the contaminated water (soil-contaminated water).

Subsequently, heavy metals contained in the liquid phase obtained in step (1) are removed (by) using a photocatalytic material. A solution (liquid phase) containing heavy metal ions is sent to a photocatalytic device comprising a photocatalytic material and a UV lamp using a feed pipe, and heavy metals are removed by a reduction reaction and an oxidation reaction using a photocatalyst, thus achieving detoxification.

A specific example of the removal method is a removal treatment by irradiation with light of 400 nm or less (a UV lamp) using a photocatalytic material. The photocatalytic material is preferably one or more photocatalytic materials mentioned above.

A photocatalytic reaction is a surface reaction. The more often a photocatalytic material and heavy metals are brought into contact with each other, the more efficiently the decomposition progresses.

It is thus preferable to arrange the photocatalytic material in a bellows shape, or to use a porous titanium metal or titanium alloy to be photocatalyzed, thereby performing a nitriding treatment and an anodizing treatment.

The heavy metals to be removed are hazardous heavy metals, such as lead, cadmium, hexavalent chromium, arsenic, mercury, and copper. The soil-contaminated water contains about 0.01 to 1,000 ppm of heavy metals, although this may vary depending on the degree of soil contamination and types of heavy metals.

When unremoved volatile organic compounds remain in the liquid phase after the reaction in step (2), a secondary treatment (process, processing) is preferably further performed to completely remove the volatile organic compounds. Examples of such secondary treatments include a method of removing heavy metals by electrolytic treatment, a method of insolubilizing heavy metals by chemical chelation, and a method of separating heavy metals by hydroxylation treatment.

A specific example of a method for removing heavy metals by electrolytic treatment is a method comprising subjecting to electrolytic reduction in an electrolytic cell a solution containing heavy metal ions remaining after the decomposition treatment using a photocatalytic material to remove the heavy metal ions from the solution.

A specific example of a method for insolubilizing heavy metals by chelation is a method comprising adding agents for chelating heavy metal ions, such as citric acid and EDTA (ethylenediaminetetraacetic acid), to a solution containing heavy metal ions to remove the heavy metal ions.

A specific example of a method for separating heavy metals by hydroxylation treatment is a method comprising adding an alkaline substance, such as sodium hydroxide or potassium hydroxide, to a solution containing heavy metal, ions to hydroxylate and thereby insolubilize heavy metals, thus removing the heavy metals.

As the secondary treatment, one of the above treatment methods may be used singly, or two or more of them may be used in combination.

The soil-contaminated water treatment device for removing heavy metals contained in soil-contaminated water (by) using a photocatalytic material according to the present invention is characterized by comprising a liquid-phase production chamber for subjecting the soil-contaminated water to a gas-liquid separation to obtain a liquid phase, and a photocatalytic device for removing the heavy metals contained in the liquid phase (by) using the photocatalytic material.

The soil-contaminated water treatment device of the present invention preferably further comprises a secondary treatment chamber for subjecting the heavy metals in the liquid phase to a treatment by using at least one method selected from the group consisting of a method of removing heavy metals by electrolytic treatment, a method of insolubilizing heavy metals by chemical chelation, and a method of separating heavy metals by hydroxylation treatment.

The liquid-phase production chamber preferably comprises an aeration tower for forming a jet stream for stirring and mixing soil-contaminated water and air; and a nozzle for ejecting soil-contaminated water into the aeration tower, and an air supply pipe for supplying pressurized air to the aeration tower. The aeration tower preferably has one or more outlets for discharging the stirred and mixed soil-contaminated water and liquid containing the heavy metals separated from, the soil-contaminated water.

The liquid-phase production chamber preferably comprises a blower for supplying pressurised air to an air supply pipe.

The gas phase production chamber preferably comprises a pump for ejecting soil-contaminated water under reduced pressure.

Soil-contaminated water ejected, from a nozzle and air pressurized through an air supply pipe are supplied to (or in) the aeration tower. In the aeration tower, volatile organic compounds contained in soil-contaminated water are transferred to (or transformed into) a gas phase, and the liquid containing heavy metals thus remains in a liquid phase.

The photocatalytic device preferably comprises a photocatalytic material and a UV lamp. The photocatalytic device preferably has a duct structure.

The soil-contaminated water treatment device of the present, invention, preferably comprises a conduit for discharging the liquid phase of detoxified soil-contaminated water ejected from the photocatalytic device.

Advantageous Effects of Invention

The method of the present invention enables significantly efficient and rapid removal by decomposition or by separation of hazardous volatile organic compounds and heavy metals in gas and liquid phases by using a photocatalytic material having high activity (such as a photocatalytic material obtained by forming titanium nitride on the surface of titanium metal, and then performing anodization).

BRIEF DESCRIPTION OF DRAWINGS

FIG. 1 is a graph showing the decomposition of trichloroethylene gas in Example 1.

DESCRIPTION OF EMBODIMENTS

Example 1

Titanium metal was maintained in a nitrogen gas atmosphere at 950° C. for 3 hours to form titanium nitride on the surface of the titanium metal. The titanium metal with titanium nitride thereon was anodized for 30 minutes at a current density of 4 A/dm$^2$ using an electrolyte solution of 1.5 M sulfuric acid, 0.1 M phosphoric acid, and 0.3 M hydrogen peroxide, thereby obtaining a photocatalytic material.

Using 50 mm squares of the photocatalytic material, 100 ml of 100 ppmV trichloroethylene gas was introduced into a glass container and subjected to light irradiation using fluorescent light (black light: Toshiba Lighting & Technology Corporation) that emits near-ultraviolet of 400 nm or less from the above with the light intensity being adjusted to 1.1 mW/cm$^2$.

FIG. 1 shows the results of measuring the trichloroethylene concentration over time.

It was found that when using a photocatalytic material comprising titanium metal and a large amount of anatase titanium oxide formed thereon by subjecting titanium metal to gas nitriding and then performing anodization, trichloroethylene gas can be highly efficiently decomposed.

Example 2

Titanium metal was maintained in a nitrogen gas atmosphere, at 950° C. for 1 hour to form titanium nitride on the surface of the titanium metal. The titanium metal with titanium nitride thereon, was anodized for 30 minutes at a current density of 4 A/dm$^2$ using an electrolyte solution of 1.5 M sulfuric acid, 0.1 M phosphoric acid, and 0.3 M hydrogen peroxide, thereby obtaining a photocatalytic material (total surface area: 52 m$^2$).

The contaminated groundwater (soil-contaminated water) was pumped and aerated (subjected to a gas-liquid separation) to obtain a gas phase containing trichloroethylene.

A photocatalytic device comprising the photocatalytic material and thirty-two UV lamps with an output of 40 W was aerated with trichloroethylene gas obtained from the soil-contaminated water and subjected to light irradiation using fluorescent light that emits ultraviolet (254 nm).

The concentrations of trichloroethylene at the inlet and outlet of the device were measured by gas chromatography.

The flow rate of the gas containing trichloroethylene obtained by pumping and aerating groundwater was set to about 5 to 9 m³/min.

Table 1 shows the results.

This result also shows that when using a photocatalytic material, comprising titanium metal and a large amount of anatase titanium oxide formed thereon by subjecting the titanium metal to gas nitriding and then performing anodization, trichloroethylene gas in the gas obtained by pumping and aerating contaminated groundwater can be decomposed in a highly efficient manner.

TABLE 1

| Trichloroethylene Concentration (ppmV) | | | |
|---|---|---|---|
| Inlet concentration | Outlet concentration | Decomposition rate (%) | Flow rate (m³/min) |
| 78 | 12 | 84.4 | 5.5 |
| 136 | 42 | 68.9 | 6.7 |
| 196 | 65 | 67.0 | 8.0 |

After the reaction of the decomposition treatment using the photocatalytic material, undecomposed trichloroethylene remained in the gas phase. Accordingly, removal by adsorption with activated carbon can be further performed as a secondary treatment to completely remove the trichloroethylene.

The invention claimed is:

1. A method for treating soil-contaminated water using a photocatalytic material to detoxify volatile organic compounds contained in the soil-contaminated water, the method comprising the steps of:
   (1) producing the photocatalytic material, wherein the photocatalytic material has a crystalline anatase titanium oxide film, by:
      (i) heating titanium or a titanium alloy under a nitrogen gas atmosphere having a nitrogen gas pressure of 0.1 MPa to 10 MPa at a temperature of 750° C. or higher for 1 to 12 hours to form a titanium nitride layer on the surface of the titanium or the titanium alloy, wherein the titanium nitride layer has a thickness of 0.5 µm to 50 µm,
      (ii) immersing the titanium or titanium alloy obtained in step (i) in an electrolyte solution containing at least one acid selected from the group consisting of inorganic acids and organic acids having an etching effect on titanium, and
      (iii) anodizing the titanium nitride layer by controlling the current so that a voltage equal to or higher than the spark-discharge-generating voltage is applied to obtain the photocatalytic material having the crystalline anatase titanium oxide film, wherein the current density ranges from 1 A/dm² to 10 A/dm²,
   (2) subjecting the soil-contaminated water to a gas-liquid separation to obtain a gas phase containing volatile organic compounds, wherein water content is reduced using a mist separator,
   (3) combining the gas phase obtained in step (2) with the photocatalytic material, and
   (4) decomposing the volatile organic compounds contained in the gas phase obtained in step (2) by irradiating the photocatalytic material with light of 400 nm or less.

2. The method according to claim 1, wherein when undecomposed volatile organic compounds remain in the gas phase after step (4), the method further comprises a step of:
   (5) subjecting the volatile organic compounds in the gas phase to a secondary treatment by using at least one method selected from the group consisting of a method of removal by adsorption with activated carbon and a method of removal by thermal oxidation.

3. A soil-contaminated water treatment device for detoxifying volatile organic compounds contained in soil-contaminated water using a photocatalytic material, the device comprising:
   a gas phase-production chamber for subjecting the soil-contaminated water to a gas-liquid separation to obtain a gas phase,
   a photocatalytic device for decomposing the volatile organic compounds contained in the gas phase by irradiating the photocatalytic material with light of 400 nm or less, wherein the photocatalytic material has a crystalline anatase titanium oxide formed on the surface of a titanium metal or a titanium alloy; and
   a mist separator in the gas-phase production chamber to reduce water content.

4. The soil-contaminated water treatment device according to claim 3, comprising a secondary treatment chamber for treating the volatile organic compounds in the gas phase by using at least one method selected from the group consisting of a method of removal by adsorption with activated carbon and a method of removal by thermal oxidation.

5. The soil-contaminated water treatment device according to claim 3, wherein the crystalline anatase titanium oxide film is obtained by a method comprising:
   (i) heating titanium or a titanium alloy under a nitrogen gas atmosphere having a nitrogen gas pressure of 0.1 MPa to 10 MPa at a temperature of 750° C. or higher for 1 to 12 hours to form a titanium nitride layer on the surface of the titanium or the titanium alloy, wherein the titanium nitride layer has a thickness of 0.5 µm to 50 µm,
   (ii) immersing the titanium or titanium alloy obtained in step (i) in an electrolyte solution containing at least one acid selected from the group consisting of inorganic acids and organic acids having an etching effect on titanium, and
   (iii) anodizing the titanium nitride layer by controlling the current so that a voltage equal to or higher than the spark-discharge-generating voltage is applied to obtain the crystalline anatase titanium oxide film, wherein the current density ranges from 1 A/dm² to 10 A/dm².

* * * * *